United States Patent [19]

Hasegawa

[11] Patent Number: 4,533,404

[45] Date of Patent: Aug. 6, 1985

[54] SOLDERING FLUXES

[75] Inventor: Masayuki Hasegawa, Hachioji, Japan

[73] Assignee: Nihon Almit Kabushiki Kaisha, Tokyo, Japan

[21] Appl. No.: 614,737

[22] Filed: May 25, 1984

[30] Foreign Application Priority Data

Jun. 1, 1983 [JP] Japan .................................. 58-95745

[51] Int. Cl.³ ............................................ B23K 35/362
[52] U.S. Cl. ......................................... 148/23; 148/24; 148/25
[58] Field of Search .............................. 148/23, 24, 25

[56] References Cited

U.S. PATENT DOCUMENTS

| | | | |
|---|---|---|---|
| 3,912,550 | 10/1975 | Bolte et al. | 148/23 |
| 4,098,621 | 7/1978 | Strauss et al. | 148/23 |
| 4,151,015 | 4/1979 | Cooper | 148/23 |
| 4,168,996 | 9/1979 | Zado | 148/23 |

Primary Examiner—Veronica O'Keefe
Attorney, Agent, or Firm—Balogh, Osann, Kramer, Dvorak, Genova & Traub

[57] ABSTRACT

The soldering flux of this invention containing a chemical reaction product precipitated when at least one member selected from normally liquid brominated aliphatic hydrocarbons is mixed with at least one member selected from the group consisting of normally liquid amino group-containing aromatic hydrocarbons and normally liquid amino group-containing aliphatic hydrocarbons can not only solder stainless steel or nickel-chromium alloys whose soldering has heretofore been thought impossible, but also does not corrode the soldered metallic material after soldering, has a higher electric insulation resistivity necessary for the soldered areas of parts of electronic and electric devices and appliances, markedly reduces defects due to poor soldering, and can secure a high reliability of soldered joints as compared with conventional fluxes.

6 Claims, 12 Drawing Figures

SOLDERING FLUXES

FIELD OF THE INVENTION

This invention relates to soldering fluxes and their production processes, and particularly to soldering fluxes containing an organic bromine compound and their production processes.

DESCRIPTION OF THE PRIOR ART

According to Japanese Patent Publication No. 34016/1977, soldering fluxes containing an organic bromine compound as an activator are known. The organic bromine compound described in this publication is 2-ethylhexylamine hydrohalide, and soldering fluxes containing 2-ethylhexylamine hydrobromide are described in the examples of this publication. The above activator is a compound soluble in water but insoluble in rosin.

Further, according to Japanese Patent Publication No. 4191/1976, soldering fluxes containing hydrazine hydrobromide as an activator are known. This activator is a compound soluble in water but insoluble in rosin. Further, this activator is a compound which, when dissolved in water, generates hydrobromic acid in the aqueous solution.

Furthermore, according to Japanese Patent Publication No. 16264/1961, soldering fluxes containing 2,4,6-tribromoaniline as an activator are known. This activator is a compound insoluble in water but soluble in rosin.

Furthermore, according to Japanese Patent Publication No. 16403/1961, soldering fluxes containing tribromophenol as an activator are known. This activator is a compound insoluble in water but soluble in rosin.

SUMMARY OF THE INVENTION

It is an object of this invention to provide soldering fluxes which can offer good solderability, do not cause oxidation of the metal in the soldered area during the soldering work, do not cause corrosion of the metal around the soldered area after soldering, do not have a problem that the metal around the soldered area is contaminated with the gas generated during soldering work, and make it possible for the residue of the soldered area to have a high electric insulation property after soldering, and to provide their production processes.

The soldering fluxes of this invention are those substantially comprising a chemical reaction product precipitated when at least one member selected from normally liquid brominated aliphatic hydrocarbons is mixed with at least one member selected from the group consisting of normally liquid, amino group-containing aromatic hydrocarbons and normally liquid, amino group-containing aliphatic hydrocarbons, or those containing the above chemical reaction product as an activator.

Although the chemical composition of the above chemical reaction product has not yet been elucidated, this product is a white crystal at normal temperature and pressure and can be easily dissolved in water in almost all proportions. It is possible to use not only this product as such advantageously as a soldering flux, but also a mixture of this product with the starting materials, or a mixture prepared by adding the chemical reaction product to well known resin, rosin, vegetable oil, animal oil, mineral oil, organic solvents, or the like advantageously as a soldering flux.

DETAILED DESCRIPTION OF THE INVENTION

A flux to be used in soldering must have the following properties (1) to (6):

(1) it has such a chemical reactivity as to permit rapid removal of oxide films on the metal to be joined and on the soldering metal, (2) it must be heat-decomposed during soldering work and cover the soldered area to keep it in a reducing atmosphere and to prevent the metal surface from being reoxidized, (3) even if an activator is left in the flux residue after soldering, the activator should not corrode the soldered area, (4) the residue after soldering has a high electric insulation property (when the product is used in electronic or electric appliances), (5) the gas generated during soldering does not contaminate the metal material around the soldered area, and (6) the flux residue does not show stickiness after soldering.

In recent years, quantities of solders have been used in the fields of electronic and electric devices and appliances, and fluxes prepared by adding an activator to resin and having a high electric insulation property are used.

Copper can be soldered by using rosin alone as a flux in such a way that, in soldering, abietic acid as the principal constituent of the rosin is activated at above 174° C. and reacts with copper oxides present on the copper surface, forming copper abietate, but when rosin is used alone, a long time for soldering is required, and the solderability is poor. In order to remove these drawbacks, various activators have been proposed, and especially chlorine-containing organic compounds are used as activators for soldering fluxes. The chlorine-containing activators, however, have a drawback that not only corrosion occurs at the soldered area but the electric insulation property at the area is also lowered, because 50 to 80% of the chlorine, as an activator, in the flux remains in the flux residue after soldering. In order to eliminate this drawback, it is necessary in case of a chlorine-containing flux that the flux residue be removed by cleaning after soldering with a hydrocarbon halide solvent such as 1,1,1-trichloroethane.

Further, there is a drawback that, when soldering is carried out by using a flux containing a chlorine-containing activator, chlorine gas is generated by the heat decomposition of the flux and adheres onto the copper surface to form CuCl and/or $Cu_2O$, with consequent lowering of the conductivity.

In order to eliminate the drawback of the above chlorine-containing activators, a proposal was made as in the above-mentioned prior examples, of using activators comprising organic compounds containing bromine in place of chlorine.

Although 2-ethylhexylamine hydrobromide was proposed as one of the activators in the above-mentioned Japanese Patent Publication No. 34016/1977, this salt has a drawback that it shows a lower spread factor, which is used as one measure of evaluating solderability, than the case where soldering is carried out by using the activator of this invention, and that the electric insulation resistivity of the above chlorine-containing flux is as low as $5 \times 10^{11}$ Ω and is poor in soldering workability, while the electric insulation resistivity of the flux containing the activator of this invention is above $1 \times 10^{15}$ Ω.

The activator proposed in the above-mentioned Japanese Patent Publication No. 4191/1976 is hydrazine hydrobromide, which is used in the form of a flux prepared by adding 1 to 10% by weight of this compound to an aqueous solution prepared by mixing nearly equal amounts of propylene glycol and water. The inventor of this invention has found from experiments that when soldering is carried out by using this flux, the soldered copper part is corroded by the action of hydrobromic acid remaining in the flux residue after soldering.

The activator proposed in the above-mentioned Japanese Patent Publication No. 16264/1961 comprises 2,4,6-tribromoaniline. Although the characteristic properties as a soldering flux are not known, because no example was described about this activator, 2,4,6-tribromoaniline, as different from the activator of this invention, is a compound which does not dissolve in water at all and, according to this publication, a flux containing this compound shows excellent solderability when heated for 120 seconds at a temperature as high as above 300° C.

Further, the activator proposed in the above-mentioned Japanese Patent Publication No. 16403/1961 comprises 2,4,6-tribromophenol. Although the characteristic properties of the activator as a soldering flux are not known, because there was no example about this compound, this compound, being different from the activator of this invention, is scarcely dissolved in water and, according to this publication, a flux containing this compound shows excellent solderability when heated for 120 seconds at a temperature as high as about 300° C.

The soldering flux of this invention is one substantially comprising a chemical reaction product precipitated when at least one member selected from normally liquid brominated aliphatic hydrocarbons is mixed with at least one member selected from the group consisting of normally liquid, amino group-containing aromatic hydrocarbons and normally liquid, amino group-containing aliphatic hydrocarbons, and the above chemical reaction product also reacts as an activator.

Among the above-described brominated aliphatic hydrocarbons (hereinafter referred to as group A compounds), those which can be suitably used include bromoethane, 1,2-dibromoethane, and acetylene tetrabromide and, among the above-mentioned amino group-containing aromatic hydrocarbons and amino group-containing aliphatic hydrocarbons (hereinafter, referred to as group B compounds), those which can be suitably used include phenylamine, methylphenylamine, dimethylaniline, and diethylaniline.

The above chemical reaction product is a white crystal and can be easily dissolved in water in almost all proportions, and it is possible to use this product alone as a soldering flux.

On the other hand, according to the experiment of the inventor of this invention, hydrazine hydrobromide mentioned above as a prior example does not show any solderability when used alone as a flux and can never be used as a flux unless it is dissolved in water or other solvents, and in this respect the flux substantially comprising the chemical reaction product has a quite unique property as compared with conventional ones.

Further, the inventor of this invention has newly found that fluxes containing, as an activator, 2-ethylhexylamine hydrobromide, hydrazine hydrobromide, 2,4,6-tribromoaniline, or 2,4,6-tribromophenol used in the prior examples can hardly solder stainless steel, nickel-chromium alloys or the like, but when the chemical reaction product is used as a flux, stainless steel, nickel-chromium alloys or the like can easily be soldered.

Figure 1:
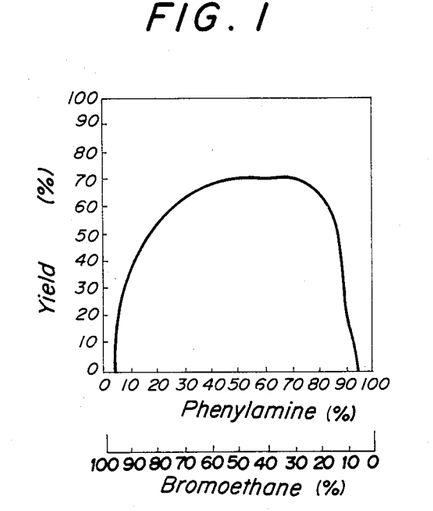
FIG. 1 is a graph showing a relationship between the bromoethane/phenylamine compositional ratios and the yields of the chemical reaction product.

Next, referring to Table 1 description will be made of relationships between the mixing ratios of a group A compound to a group B compound in producing the chemical reaction product of this invention and the yields of the product. The yield (% by weight) is defined as the parts by weight of the product formed by the chemical reaction of a group A compound with a group B compound, per 100 parts by weight of the total weight of the group A compound and the group B compound. In these experiments, the above yield of the chemical reaction product refers to one that is determined with regard to the product formed when a group A compound is mixed with a group B compound and the mixture is allowed to stand at room temperature (20° C.) for 30 days. FIGS. 1 to 12 show the results. FIG. 1 is a graph showing a variation in the yield of the chemical reaction product formed when bromoethane as group A compound is mixed with phenylamine as group B compound in various ratios. This figure shows that, in order that the above chemical reaction product can be produced advantageously in yields to exhibit a soldering flux effect, say above 20%, it is necessary that the mixing ratio of bromoethane as group A compound to phenylamine as group B compound falls within the range of 1/9 to 9/1.

FIGS. 2 to 12 show a variation in the yield of the chemical reaction product formed when a group A compound and a group B compound shown in the following table are reacted together in various ratios.

Although FIGS. 1 to 12 contain examples in which at least one member selected from the group A compounds is reacted with at least one member selected from the group B compounds, it is possible also in the following cases to obtain chemical reaction products in yields of above 20% by using a mixing ratio of group A compounds to group B compounds falling within the range of 1/9 to 9/1: a case where at least one member selected from group A compounds was mixed with at least two members selected from group B compounds, a case where at least two members selected from group A compounds are mixed with at least one member selected from group B compounds, and a case where at least two members selected from group A compounds are mixed with at least two members selected from group B compounds.

TABLE 1

Figure 2:
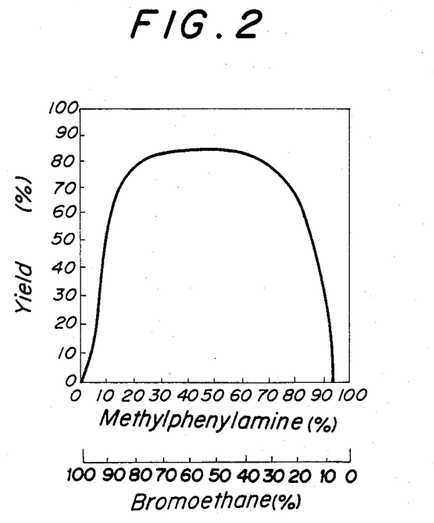
FIG. 2 is a graph showing a relationship between the bromoethane/methylphenylamine compositional ratios and the yields of the chemical reaction product.
Figure 3:
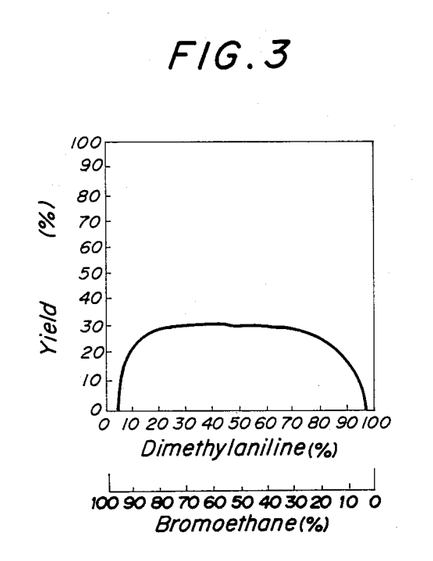
FIG. 3 is a graph showing a relationship between the bromoethane/dimethylaniline compositional ratios and the yields of the chemical reaction product.
Figure 4:
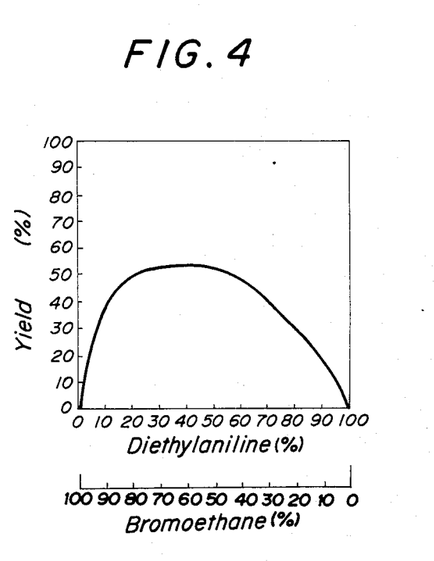
FIG. 4 is a graph showing a relationship between the bromoethane/diethylaniline compositional ratios and the yields of the chemical reaction product.
Figure 5:
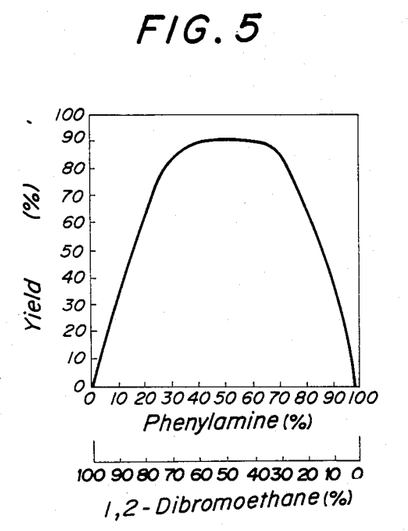
FIG. 5 is a graph showing a relationship between the 1,2-dibromoethane/phenylamine compositional ratios and the yields of the chemical reaction product.
Figure 6:
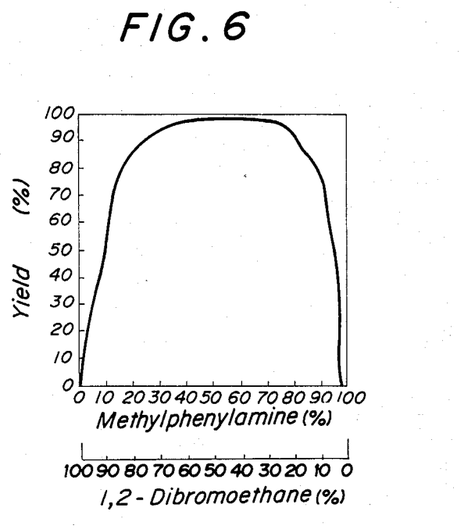
FIG. 6 is a graph showing a relationship between the 1,2-dibromoethane/methylphenylamine compositional ratios and the yields of the chemical reaction product.
Figure 7:
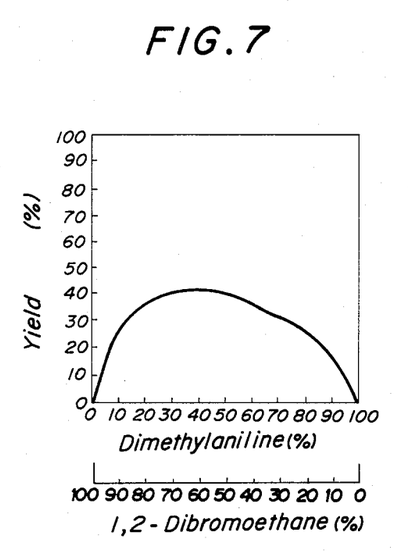
FIG. 7 is a graph showing a relationship between the 1,2-dibromoethane/dimethylaniline compositional ratios and the yields of the chemical reaction product.
Figure 8:
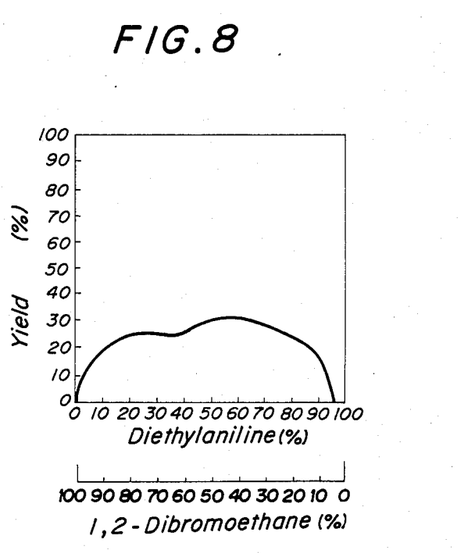
FIG. 8 is a graph showing a relationship between the 1,2-dibromoethane/diethylaniline compositional ratios and the yields of the chemical reaction product.
Figure 9:
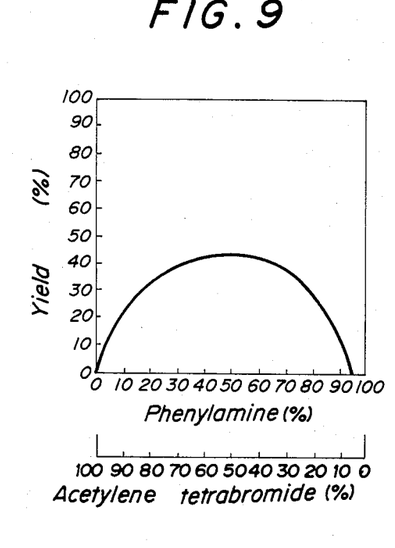
FIG. 9 is a graph showing a relationship between the acetylene tetrabromide/phenylamine compositional ratios and the yields of the chemical reaction product.
Figure 10:
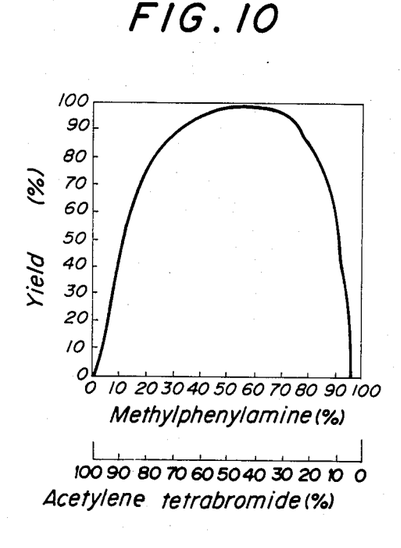
FIG. 10 is a graph showing a relationship between the acetylene tetrabromide/methylphenylamine compositional ratios and the yields of the chemical reaction product.
Figure 11:
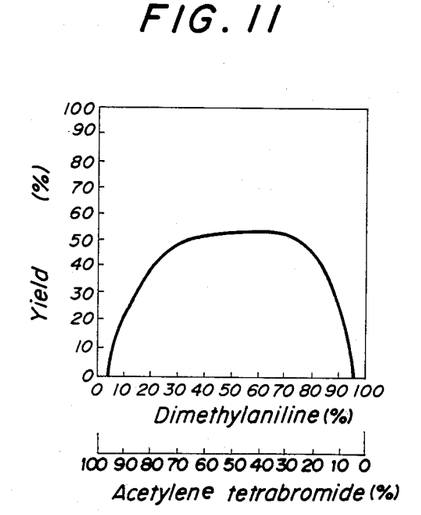
FIG. 11 is a graph showing a relationship between the acetylene tetrabromide/dimethylaniline compositional ratios and the yields of the chemical reaction product.
Figure 12:
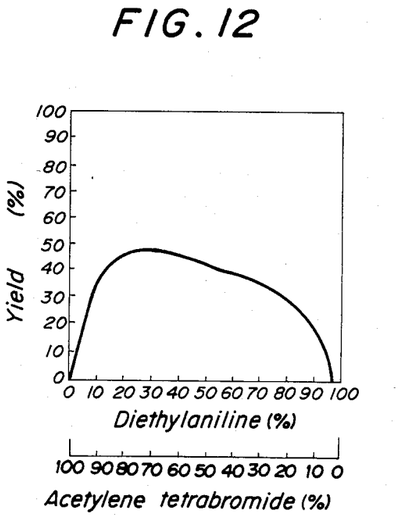
FIG. 12 is a graph showing a relationship between the acetylene tetrabromide/diethylaniline compositional ratios and the yields of the chemical reaction product.

| | Group A compounds | Group B compounds |
| --- | --- | --- |
| FIG. 1 | bromoethane | phenylamine |
| FIG. 2 | bromoethane | methylphenylamine |
| FIG. 3 | bromoethane | dimethylaniline |
| FIG. 4 | bromoethane | diethylaniline |
| FIG. 5 | 1,2-dibromoethane | phenylamine |
| FIG. 6 | 1,2-dibromoethane | methylphenylamine |
| FIG. 7 | 1,2-dibromoethane | dimethylaniline |
| FIG. 8 | 1,2-dibromoethane | diethylaniline |
| FIG. 9 | acetylene tetrabromide | phenylamine |
| FIG. 10 | acetylene tetrabromide | methylphenylamine |
| FIG. 11 | acetylene tetrabromide | dimethylaniline |
| FIG. 12 | acetylene tetrabromide | diethylaniline |

Like FIG. 1, FIGS. 2 to 12 show that the mixing ratio by weight of a group A compound to a group B compound which can provide the yield of the chemical reaction product of not less than 20% falls within the range of 1/9 to 9/1. When the yield of the above chemical reaction product is lower than 20%, the production cost of the chemical reaction product becomes so high uneconomically that it is necessary that the mixing ratio by weight of a group A compound to a group B compound falls within the range of 1/9 to 9/1.

Description will now be made of the production process of the flux of this invention.

At least one member selected from group A compounds and at least one member selected from group B compounds are mixed together in a mixing ratio by weight in the range of 1/9 to 9/1 at a temperature in the range of room temperature to 100° C., and agitated and then allowed to stand still to precipitate a white chemical reaction product. When this product is separated from the above reaction mixture by filtration, centrifugation, or a like operation, the separated product containing the chemical reaction product and a small amount of the reaction mixture containing unreacted materials can be obtained.

Then, the separated product is introduced into water, whereupon only the chemical reaction product dissolves in water and the mixture is separated into two phases. The aqueous phase is separated from the mixture.

Next, the water of the aqueous solution is evaporated by heating it to about 100° C. to obtain the chemical reaction product of a high purity.

The above chemical reaction product can be used advantageously as a soldering flux of this invention. It is also possible to use the separated product containing the above chemical reaction product and a small amount of the reaction mixture containing unreacted materials as the soldering flux of this invention. Furthermore, it is possible to use a solution comprising at least 20% by weight of a chemical reaction product prepared by mixing at least one member selected from the above-mentioned group A compounds with at least one member selected from the above-mentioned group B compounds in a mixing ratio in the range of 1/9 to 9/1 at a temperature in the range of room temperature to 100° C. as the soldering flux of this invention.

Furthermore, it is also possible to use advantageously a product prepared by adding at least 3% by weight of the above chemical reaction product to one or more members selected from the group (hereinafter referred to as group C compounds) consisting of resin, rosin, vegetable oil, animal oil, and organic solvents as the soldering flux of this invention.

Furthermore, it is also possible to use advantageously a product prepared by adding the above separated product to a group C compound and containing at least 3% by weight, based on the total weight, of the chemical reaction product as a soldering flux.

Furthermore, it is also possible to use advantageously a product containing a mixed solution obtained by adding at least one member selected from the group A compounds and at least one member selected from the above group B compounds in a mixing ratio in the range of 1/9 to 9/1 to a group C compound and further containing at least 3% by weight of the above chemical reaction product as the soldering flux of this invention.

With respect to the above fluxes, it is possible to use advantageously those which are the products obtained by adding at least one member selected from group A compounds and at least one member selected from group B compounds in a mixing ratio in the range of 1/9 to 9/1 to a group C compound, and allowing the resulting mixture to stand for a predetermined time, say 24 hours, and which contain at least 3% by weight of the above chemical reaction product, as the soldering fluxes of this invention.

According to this invention, when a group C compound is solid at room temperature, it is advantageous to use the group C compound liquified by heating for admixing the compound with a flux containing this chemical reaction product, or with a group A compound and a group B compound.

This invention will now be described in detail with reference to examples.

EXAMPLE 1

A 5-l flexible polyethylene vessel was charged with 2.5 kg of bromoethane which was one of group A compounds, and further charged with 2.5 kg of phenylamine which was one of group B compounds. The mixture was then agitated to form a uniform mixture. When this mixture was allowed to stand still, a white crystalline chemical reaction product was precipitated from the solution. When the above mixture was allowed to stand still for 24 hours at room temperature, a chemical reaction product of this invention was obtained in a yield of about 70% as shown in FIG. 1. When the product was further allowed to stand still, the yield of the product reached about 78% after 30 days. Namely, it was found that the ratio of the yield of the product after 24-hour standing to that of the product after 30-day standing was 0.9.

Accordingly, in the following examples, a length of 24 hours is selected as the standing time for precipitating a chemical reaction product by mixing group A and group B compounds under conditions of varied kinds and mixing ratios, and allowing the mixtures to stand still.

In the same manner as above, 2.5 kg of bromoethane and 2.5 kg of phenylamine were mixed together and allowed to stand still for 24 hours to precipitate a chemical reaction product. Then, 1.575 kg of bromoethane and 1.575 kg of phenylamine were added to the filtrate obtained by separating the above chemical reaction product from the above reaction mixture by filtration and agitated and then allowed to stand still for 24 hours to precipitate the chemical reaction product further.

The above precipitate separated by filtration contained a small amount of bromoethane and phenylamine adherent thereto. When the above precipitate was placed in an equal amount of purified water, the precipitate was dissolved therein and a water-insoluble mixture of bromoethane and phenylamine formed a layer separated from the aqueous solution. After separating this mixture from the aqueous solution by decantation, the aqueous solution was heated to about 100° C. to evaporate water to obtain a chemical reaction product of a high purity.

As a result of soldering work carried out by using this product as a flux, it was found that the product was a remarkably excellent flux.

EXAMPLE 2

8.6 kg of normally solid rosin was molten by heating to 120° C. To this molten rosin were added 0.7 kg of bromoethane and 0.7 kg of phenylamine, and the mixture was mixed uniformly and allowed to cool spontaneously to room temperature.

As a result of soldering work carried out by using the obtained flux, it was found that the flux was a remarkably excellent one.

EXAMPLE 3

1.4 kg of rosin was dissolved in 7.5 kg of isopropyl alcohol. To this solution were added 2.5 kg of 1.2-dibromoethane and 2.5 kg of dimethylphenylamine, and the resulting mixture was stirred and then allowed to stand for 24 hours.

As a result of soldering work carried out by using the obtained mixture as a soldering flux, it was found that this mixture was an extremely excellent flux.

EXAMPLE 4

Table 2 shows the results of Experimental Examples 1 to 12 obtained by testing the colors, forms, solubilities in water or rosin, and solderability of the chemical reaction products for copper or stainless steel obtained by mixing at least one member selected from A compounds with at least one member selected from B compounds, and allowing the mixture to stand for 24 hours at room temperature. This table contains also several well-known activators as Prior-art Examples 1 to 4.

TABLE 2

| Designation | Activators | Color | Form | Solubility water | Solubility rosin | Solderability copper | Solderability stainless steel |
|---|---|---|---|---|---|---|---|
| Prior-art Example 1 | 2-ethylhexylamine | | | O | X | O | X |
| Prior-art Example 2 | hydrazine hydrobromide | white | crystal | O | X | X | X |
| | 2,4,6-tribromoaniline | | | X | O | O | X |
| Prior-art Example 3 | 2,4,6-tribromophenol | | | X | O | O | X |
| Prior-art Example 4 | 2,4,6-tribromophenol | | | | | | |
| Exp. Example 1 | CRP* of bromoethane with phenylamine | white | crystal | | X | | O |
| Exp. Example 2 | CRP of bromoethane with methylphenylamine | " | " | | X | | O |
| Exp. Example 3 | CRP of bromoethane with dimethylaniline | " | " | | X | | O |
| Exp. Example 4 | CRP of bromoethane with diethylaniline | " | " | | X | | O |
| Exp. Example 5 | CRP of 1,2-dibromoethane with phenylamine | " | " | | X | | O |
| Exp. Example 6 | CRP of 1,2-dibromoethane with methylphenylamine | " | " | | X | | O |
| Exp. Example 7 | CRP of 1,2-dibromoethane with dimethylaniline | " | " | | X | | O |
| Exp. Example 8 | CRP of 1,2-dibromoethane with diethylaniline | " | " | | X | | O |
| Exp. Example 9 | CRP of acetylene tetrabromide with phenylamine | " | " | | X | | O |
| Exp. Example 10 | CRP of acetylene tetrabromide with methylphenylamine | " | " | | X | | O |
| Exp. Example 11 | CRP of acetylene tetrabromide with dimethylaniline | " | " | | X | | O |
| Exp. Example 12 | CRP of acetylene tetrabromide with diethylaniline | " | " | | X | | O |

*CRP refers to chemical reaction product.

Here, the solubility in rosin represents a degree to which an activator can be dissolved in rosin molten by heating to 120° C. indicates a greater degree of solubility, O a medium degree of solubility, and X a smaller degree of solubility.

The solderability represents the property of soldering obtained when copper or stainless steel was soldered by using a solder consisting of 60% by weight of Sn and 40% by weight of Pb and an activator shown in the table. indicates the best solderability, O good solderability, and X impossibility of soldering. In this table, the group A compounds were bromoethane in Experimental Examples 5 to 8, and acetylene tetrabromide in Experimental Examples 9 to 12, and the group B compounds were those shown in the table.

Furthermore, in this table, Comparative Examples 1 to 4 showed the results obtained when the prior-art examples cited above, i.e., the activators described in Japanese Patent Publication Nos. 34016/1977, 4191/1976, 16264/1961 and 16403/1961 are each used alone as flux. It can be seen from these Comparative Examples that the activator of Comparative Example 1 showed a remarkably good solderability for copper but no solderability for stainless steel; the activator of Comparative Example 2, when used alone, showed no solderability for copper nor stainless steel, but when used in soldering in the form of a solution in water and propylene glycol, gained solderability for copper but no solderability for stainless steel. Further, the activators of Comparative Examples 3 and 4, when used alone, show medium solderability for copper but no solderability for stainless steel.

Further, the activators of Comparative Examples 1, 3, and 4, even when used in admixture with rosin, show the results of solderability similar to those shown in Table 2.

Further, Table 3 shows the results of the driability, spread factors, resistivity values of water extracts of fluxes prepared by adding the activator of this invention to rosin, a solution of rosin in alcohol, polyethylene glycol, vaseline, or the like. These properties were tested according to Federal Specification QQ-S-571E. This table also shows the results of the electric insulation resistivities and copper plate corrosion obtained by the test according to JIS-Z-3197.

TABLE 3

| Designation | Composition of flux (wt. %) | | Spread factor (%) | Electric insulation resistivity ($\Omega$) | Specific resistivity of water extract ($\Omega \cdot cm$) | Copper plate corrosion test | Driability |
|---|---|---|---|---|---|---|---|
| | Flux base | Activator (chem. react. prod.) | | | | | |
| Comp. Ex. 1 company A (U.S.A) | rosin | unknown | 82.5 | $4.5 \times 10^{12}$ | 115000 | O | O |
| Comp. Ex. 2 company B (U.S.A.) | " | " | 76.8 | $1.5 \times 10^{13}$ | 143000 | O | O |
| Comp. Ex. 3 company A (U.K.) | " | " | 81.5 | $2.0 \times 10^{12}$ | 138000 | O | O |
| Comp. Ex. 4 company A (Japan) | " | " | 96.5 | $1 \times 10^{8}$ | 3000 | X | O |
| Comp. Ex. 5 company B (Japan) | " | " | 94.5 | $2 \times 10^{12}$ | 56000 | X | O |
| Exp. Ex. 13 | rosin 95.5 | 4.5 | 93.6 | $5 \times 10^{15}$ | 254000 | O | O |
| Exp. Ex. 14 | " | " | 92.8 | $5 \times 10^{15}$ | 239000 | O | O |
| Exp. Ex. 15 | " | " | 93.1 | $4.5 \times 10^{15}$ | 230000 | O | O |
| Exp. Ex. 16 | " | " | 93.0 | $7 \times 10^{15}$ | 265000 | O | O |
| Exp. Ex. 17 | " | " | 92.7 | $3 \times 10^{15}$ | 240000 | O | O |
| Exp. Ex. 18 | " | " | 93.1 | $4 \times 10^{15}$ | 230000 | O | O |
| Exp. Ex. 19 | " | " | 93.1 | $4 \times 10^{15}$ | 233000 | O | O |
| Exp. Ex. 20 | " | " | 93.0 | $4 \times 10^{15}$ | 210000 | O | O |
| Exp. Ex. 21 | " | " | 92.5 | $2.5 \times 10^{15}$ | 251000 | O | O |
| Exp. Ex. 22 | " | " | 93.8 | $5 \times 10^{15}$ | 290000 | O | O |
| Exp. Ex. 23 | " | " | 93.7 | $4 \times 10^{15}$ | 200000 | O | O |
| Exp. Ex. 24 | " | " | 92.0 | $4 \times 10^{15}$ | 205000 | O | O |
| Exp. Ex. 25 | rosin 97.5 | 2.5 | 87.5 | $1.1 \times 10^{16}$ | 387000 | O | O |
| Exp. Ex. 26 | rosin 97.0 | 3.0 | 90.4 | $8.8 \times 10^{15}$ | 304000 | O | O |
| Exp. Ex. 27 | rosin 95.0 | 5.0 | 94.0 | $3 \times 10^{15}$ | 202000 | O | O |
| Exp. Ex. 28 | rosin 90.0 | 10.0 | 95.0 | $2 \times 10^{14}$ | 183000 | O | O |
| Exp. Ex. 29 | rosin 85.0 | 15.0 | 95.5 | $2.3 \times 10^{14}$ | 106000 | O | O |
| Exp. Ex. 30 | rosin 80.0 | 20.0 | 96.0 | $2 \times 10^{14}$ | 91000 | O | O |
| Exp. Ex. 31 | rosin 75.0 | 25.0 | 96.0 | $1 \times 10^{12}$ | 55000 | O | O |
| Exp. Ex. 32 | rosin 95, 1,2-dibromoethane 2.5, methylphenylamine 2.5 | | 92.0 | $3.2 \times 10^{15}$ | 240000 | O | O |
| Exp. Ex. 33 | rosin 97, 1,2-dibromoethane 1.5, methylphenylamine 1.5 | | 80.7 | $8.3 \times 10^{15}$ | 230000 | O | O |
| Exp. Ex. 34 | rosin 86, 1,2-dibromoethane 7.0, methylphenylamine 7.0 | | 93.0 | $4 \times 10^{14}$ | 150000 | O | O |
| Exp. Ex. 35 | rosin 84, 1,2-dibromoethane 8.0, methylphenylamine 8.0 | | 94.2 | $3 \times 10^{16}$ | 189000 | O | O |
| Exp. Ex. 36 | rosin 89, bromoethane 5.5, phenylamine 5.5 | | 90.0 | $4 \times 10^{15}$ | 430000 | O | O |
| Exp. Ex. 37 | rosin 14, isopropyl alcohol 75, bromoethane 5.5, phenylamine 5.5 | | 91.1 | $9 \times 10^{15}$ | 127000 | O | O |
| Exp. Ex. 38 | rosin 20, isopropyl alcohol 70, bromoethane 2.5, phenylamine 2.5 | | 90.9 | $2 \times 10^{15}$ | 136000 | O | O |
| Exp. Ex. 39 | polyethylene glycol 95.5 | 4.5 | 92.5 | — | — | O | O |
| Exp. Ex. 40 | vaseline 95.5 | 4.5 | 94.0 | — | — | O | X |

In Table 3, Experimental Examples 13 to 24 show the results obtained by carrying out the various tests about fluxes obtained by adding to rosin, 4.5% by weight, based on the total weight of the product and rosin, of a chemical reaction product obtained by combining the group A and group B compounds shown in FIGS. 1 to 12; Experimental Examples 25 to 31 show the results obtained by carrying out the similar tests about fluxes of different ratios of the product to rosin; Experimental Examples 32 to 38 show the results of the similar tests carried with the above fluxes obtained by adding group A and group B compounds to rosin and effecting the chemical reaction of the group A compound with the group B compound in the rosin; Experimental Example 39 shows the results of the similar tests carried with a flux obtained by adding the activator of this invention to polyethylene glycol in place of rosin; and Experimental Example 40 shows the results obtained by carrying out the similar tests about a flux obtained by adding the activator of this invention to vaseline in place of rosin. Further, Comparative Examples 5 to 9 in which the solders were commercially available products showed the results of the similar tests to above these solders.

In the fluxes of Experimental Examples 13 to 24, the driability of the flux residues after soldering was good in all cases, the spread factors fell within the range of 92.0% to 93.8% and showed no dispersion, the electric insulation resistivities were higher than $1 \times 10^{15} \Omega$, the specific resistivities of water extracts were higher than $205,000 \Omega.cm$, and no copper corrosion occurred, when the fluxes contain equal amounts (4.5% by weight) of the chemical reaction products even if the products were prepared from different group A compounds and different group B compounds.

Experimental Examples 25 to 31 show the results of tests carried out by varying the ratio of the chemical reaction products to rosin. Experimental Example 25, which was an example where the chemical reaction product content was as low as 2.5% by weight, showed the results of low spread factor of 87.5% and poor workability, but showed the results of an insulation resistivity of as high as $1.1 \times 10^{16} \Omega$, a specific resistivity of water extracts of as high as $387,000 \Omega.cm$, and excellent copper plate corrosion tests and good driability. From the results of the above various tests in Experimental Examples 25 to 31, it was found that when the content of the activator of this invention in rosin was below 3% by weight, the values of spread factors were not good, so that it was advantageous for a soldering flux to be added at least 3% by weight of the activator of this invention to rosin.

Concerning fluxes prepared by adding the above group A and group B compounds to rosin and forming and precipitating the chemical reaction products in the rosin, the results of the above tests shown in Experimental Examples 32 to 36 were obtained. Experimental Example 32 was a flux prepared by mixing 2.15% by weight of 1,2-bromoethane as a group A compound with 2.5% by weight of methylphenylamine as a group B compound, and when this mixing ratio was used, the yield of the chemical reaction product was above 90% as shown in FIG. 6, and the sum of group A and group B compounds was 5% by weight, and hence the activator of this invention was precipitated in an amount of 5% by weight $\times 0.9 = 4.5$ (% by weight) or higher. Namely, Experimental Example 32 was comparable to Experimental Example 18 and showed the results of spread factors, electric insulation resistivities, and specific resistivities of water extracts all of which were nearly the same as those of Experimental Example 18. The results of driability and copper plate corrosion test were good. As compared with Experimental Example 32, Experimental Example 33 had a sum of group A and group B compounds of 3% by weight, and the content of the chemical reaction product of this invention in rosin was below 3% by weight as determined from the yield in FIG. 6. Experimental Example 33 showed a spread factor of as low as 80.3% and poor soldering workability, but showed a high electric insulation resistivity and a high specific resistivity of water extract and good results of driability and copper plate corrosion test. Experimental Example 33 showed a low spread factor and had no prevalence, and this Example also showed that it was suitable to add at least 3% by weight of the activator of this invention to rosin. Experimental Examples 34 and 35 showed good results when subjected to the various tests. Experimental Example 36 was a flux prepared by effecting the direct chemical reaction of bromoethane as a group A compound with dimethylaniline as a group B compound in rosin, and showed good results as shown in Table 3 when subjected to the various tests. Experimental Examples 37 and 38 were fluxes prepared by carrying out the chemical reaction of 1,2-dibromoethane as a group A compound with methylphenylamine as a group B compound in a solution of rosin in isopropyl alcohol, and showed good tests results as shown in Table 3. Experimental Example 39 in which the flux was prepared by adding the activator of this invention to polyethylene glycol in place of rosin, and Experimental Example 40 in which the activator of this invention was added to vaseline as a principal constituent of the flux in place of rosin showed test results including good spread factors. Because electric insulation resistivity and specific resistivity of water extract are not prescribed in the above-mentioned Federal Specification QQ-S-571E, they were not measured. The results of copper plate corrosion test and driability were all good.

Thus, as compared with conventional soldering fluxes, the soldering flux of this invention can not only solder stainless steel or nickel-chromium alloys whose soldering had heretofore been thought impossible, but also does not corrode the soldered metallic material after soldering, has a higher electric insulation resistivity necessary for the soldered areas of parts of electronic and electric devices and appliances, markedly reduces defects due to poor soldering, and can secure a high reliability of soldered joints.

What is claimed is:

1. A soldering flux substantially comprising a chemical reaction product prepared by reacting at least one member selected from the group consisting of bromoethane, 1,2-dibromoethane, and acetylene tetrabromide with at least one member selected from the group consisting of phenylamine, methylphenylamine, dimethylaniline, and diethylaniline.

2. A soldering flux substantially comprising a chemical reaction product produced by reacting at least one member selected from the group consisting of bromoethane, 1,2-dibromoethane, and acetylene tetrabromide with at least one member selected from the group consisting of phenylamine, methylphenylamine, dimethylaniline, and diethylaniline, and at least one member selected from the group consisting of bromoethane, 1,2-dibromoethane, acetylene tetrabromide, phenylamine, methylphenylamine, dimethylaniline, and diethylaniline.

3. A soldering flux as defined in claim 2, wherein said chemical reaction product is contained in an amount of at least 20% by weight, based on the total weight of the flux.

4. A soldering flux as defined in claim 1, wherein at least one member selected from the group consisting of resin, rosin, vegetable oil, animal oil, mineral oil, and organic solvents is added to said chemical reaction product.

5. A soldering flux as defined in claim 2, wherein at least one member selected from the group consisting of resin, rosin, vegetable oil, animal oil, mineral oil, and organic solvents is added to a mixture of said chemical reaction product with at least one member selected from the group consisting of bromoethane, 1,2-dibromoethane, acetylene tetrabromide, phenylamine, methylphenylamine, dimethylaniline, and diethylaniline.

6. A soldering flux as defined in claim 4 or 5, wherein said chemical reaction product is contained in an amount of at least 3% by weight, based on the total weight of the flux.

* * * * *